United States Patent [19]

Neff et al.

[11] Patent Number: 5,726,508
[45] Date of Patent: Mar. 10, 1998

[54] LINEAR VOICE COIL RETRACTOR

[75] Inventors: Edward A. Neff, Rancho Santa Fe; Chia-Tung Chen, Fullerton, both of Calif.

[73] Assignee: Systems, Machines, Automation Components Corporation, Carlsbad, Calif.

[21] Appl. No.: 567,915

[22] Filed: Dec. 6, 1995

[51] Int. Cl.$^6$ ............... H02K 41/00; B23P 19/00
[52] U.S. Cl. ............... 310/12; 29/740; 29/739
[58] Field of Search ............... 310/12, 13, 14; 318/115; 29/834, 739, 740, 741, 743, 744

[56] References Cited

U.S. PATENT DOCUMENTS

| | | | |
|---|---|---|---|
| 2,570,485 | 10/1951 | Rieber | 209/605 |
| 3,539,006 | 11/1970 | Hanns et al. | 209/555 |
| 3,743,093 | 7/1973 | Klancnik | 209/549 |
| 4,498,023 | 2/1985 | Stout | 310/14 |
| 4,750,272 | 6/1988 | Caddell | 33/639 |
| 4,922,434 | 5/1990 | Fule | 395/94 |
| 5,175,456 | 12/1992 | Neff et al. | 310/13 |
| 5,310,064 | 5/1994 | Neff et al. | 209/604 |
| 5,315,189 | 5/1994 | Neff et al. | 310/12 |
| 5,317,222 | 5/1994 | Neff et al. | 310/13 |
| 5,323,133 | 6/1994 | Heath et al. | 335/222 |
| 5,446,323 | 8/1995 | Neff et al. | 310/12 |
| 5,451,824 | 9/1995 | Sieber et al. | 310/80 |
| 5,519,295 | 5/1996 | Jatnieks | 318/453 |

FOREIGN PATENT DOCUMENTS

| | | |
|---|---|---|
| 0 534 786 A1 | 3/1993 | European Pat. Off. |
| 0 614 265 A2 | 3/1993 | European Pat. Off. |
| 27 09 074 A 1 | 9/1977 | Germany |
| 1 361 294 | 7/1974 | United Kingdom |

*Primary Examiner*—Steven L. Stephan
*Assistant Examiner*—Judson H. Jones
*Attorney, Agent, or Firm*—Nydegger & Associates

[57] ABSTRACT

An actuator for precisely moving and positioning a manufacturing component includes a housing on which a magnet is mounted. An electromagnetic is slidingly mounted on the housing for movement within the magnetic field generated by the magnet. A rod, having a member for gripping the component, is attached for translational movement with the electromagnetic coil. In the operation of the actuator, a current is selectively applied to the electromagnetic coil. The current in the coil creates a magnetic field that moves the electromagnetic coil and the attached grip within the magnetic field to position the component as desired in translation. A retractor causes the grip to preferentially adopt a predetermined position, or dwell configuration.

13 Claims, 2 Drawing Sheets

LINEAR VOICE COIL RETRACTOR

FIELD OF INVENTION

The present invention pertains generally to machines which are useful for the automated assembly of products. More specifically, the present invention pertains to apparatus and devices which are useful for inspecting, assembling and positioning component parts in a product assembly process. The present invention is particularly, but not exclusively, useful as an actuator for the quick movement and precise positioning of relatively fragile component parts during an automated assembly procedure while generating both extremely light forces and normal forces on the component parts.

BACKGROUND OF THE INVENTION

Numerous devices have been developed to aid in the automated assembly of goods and products. In each instance, automated assembly devices have been employed with a view toward increasing the reliability, efficiency and accuracy of the methods, procedures and processes which are followed during the manufacture and the assembly of a completed product. Indeed, the vast majority of consumer products are now manufactured on assembly lines using automated assembly devices.

One type of device that is useful for automated assembly is the linear voice coil actuator. Actuators of this type may be used to move and position assembly components and offer a unique combination of compact design, light action handling and high precision movement. In general, this combination of features is not attainable using more traditional assembly actuators such as solenoids, stepper motors or pneumatic devices. For these reasons, the voice coil actuator is becoming an increasingly popular component in design and construction of automated assembly apparatus.

Structurally, linear voice coil actuators generally include an electromagnetic coil slidingly mounted to traverse the length of a fixed-pole magnet. The electromagnetic coil consists of a hollow bobbin or spool which is wrapped in electrically conductive windings. Electric current applied to the windings causes the coil to slide along the fixed-pole magnet and the force generated by the coil and the direction of movement of the coil may be controlled by appropriate adjustments to the electric current. A grip or other manipulation means is attached to move translationally with the electromagnetic coil. In general, the electric current applied to the coil may be used to translationally position the grip at either a fully retracted configuration, a fully extended configuration or any intermediate configuration.

In operation, the grip is used to grasp an assembly component. An electric current is then applied to the coil to cause the coil and grip to move or otherwise reposition the component translationally. When the component has reached the desired position, the grip releases the component. The process is then repeated for additional components. A linear voice coil which includes these basic elements is disclosed in U.S. Pat. No. 5,315,189 which issued to Neff for an invention entitled "Actuator with Translational and Rotational Control."

The basic design for a linear voice coil actuator, as generally described in the preceding paragraphs, has been adapted to perform a wide range of assembly tasks and procedures. In particular, the basic actuator design has proven to be a highly effective means for transporting or repositioning assembly components over short vertical distances. When used in this fashion, the grip is used to grasp an assembly component. An electric current then causes the grip to move in translation to lift, or otherwise vertically reposition, the assembly component. The entire actuator may then be moved in translation or in rotation before the component is released and the process repeated. The use of linear voice coil actuators as a means to perform this type of vertical repositioning has been found to be particularly useful when used in combination with moving assembly lines where a sequence of assembly components are passed under the actuator.

The use of linear voice coil actuators, as a means of vertically repositioning assembly components, is not without its difficulties. One such difficulty involves the speed with which the actuator can translationally relocate assembly components. More specifically, it may be appreciated that in cases where heavy components are to be relocated, the actuator will tend to respond more slowly as it works to overcome the weight of the component. The tendency to work more slowly, of course, increases cycle time and slows production.

Another difficulty associated with the use of linear voice coil actuators as a means of vertically repositioning assembly components involves power consumption and heat dissipation. More specifically, it may be appreciated that during the course of a particular assembly process, the actuator will repeatedly cycle through a range of translational configurations. As previously discussed, the configurations range from the configuration where the grip is fully retracted to the configuration where the grip is fully extended. Additionally, during typical operation, the actuator will be caused to hold each successive translational configuration for some measurable period of time or interval. Intervals where the actuator lingers at a particular translational configuration are generally referred to as dwell periods.

During each dwell period, an actuator which is configured to lift assembly components will continuously consume electrical energy as the force supplied by the coil resists the combined weight of the assembly component and grip. As this energy is consumed, there is, of course, a resulting output of waste heat from the electromagnetic coil. In cases where a particular dwell period has a long duration, heat production from the electromagnetic coil may be substantial, especially in cases where heavy assembly components are being manipulated.

Unfortunately, waste heat produced by the actuator may be problematic. More specifically, there is a tendency for waste heat to accumulate within the actuator. As the actuator becomes hotter, the internal efficiency of the actuator decreases and the actuator requires an increased amount of electrical current to perform the same work. Additionally, in cases where the amount of heat exceeds the ability of the actuator to dissipate thermal energy, the actuator may become excessively hot with an associated risk of failure. In other cases, the actuator may be able to continue operation at an elevated temperature. In such cases, however, the elevated operational temperature may result in thermal distortion of the actuator'internal mechanism and a generally higher rate of wear for that mechanism. In either case, it may be appreciated that an extended elevation in the operational temperature of the actuator may lead to a decrease in the mean time between failures (MTBF) for a given actuator type.

Another disadvantage associated with the use of linear voice coil actuators as a lifting means has been the tendency for the actuator to adopt the fully extended configuration under power failure conditions. In more detail, it may be appreciated that the position of the coil and grip of a linear voice coil actuator is dependent on the presence and magnitude of the electrical current applied to the electromagnetic coil. In cases where the electrical current is removed, however, the coil and grip are free to move translationally. As a result, when the actuator is oriented to lift or vertically reposition assembly components and a power failure condition occurs, the weight of the grip and coil tends to cause the grip to adopt the extended configuration. This can lead to several undesirable results. One such result, which is easily appreciated, is the tendency under power failure for the actuator to inadvertently lower a lifted component and thereby damage the component or other components on the assembly line. Another undesirable result occurs when power failure causes the extended actuator to contact components of the assembly apparatus which continue to move through inertia or separate power supply.

In light of the above, it is an object of the present invention to provide an actuator for moving, inspecting and positioning assembly components in an automated assembly operation. Yet another object of the present invention is to provide an actuator which reduces power consumption and associated thermal waste produced during operation of the actuator. Yet another object of the present invention to provide an actuator which assumes a known and predetermined configuration in the event of a power failure. Yet another object of the present invention to provide an actuator which efficiently moves large masses with relatively great speed. Still another object of the present invention is to provide an actuator which is relatively simple to use, relatively easy to manufacture and comparatively cost effective.

SUMMARY OF THE PREFERRED EMBODIMENT

An actuator for transporting and positioning a workpiece in an automated assembly procedure includes a housing formed to enclose a chamber. A fixed-pole magnet is mounted within the housing to establish a fixed magnetic field within the chamber. The fixed-pole magnet is preferably a rare earth magnet and is formed as a substantially rectangular projection that extends through the length of the enclosed chamber. An electromagnetic coil, formed with an open passageway, is slidingly mounted to the housing for translational movement within the chamber. The coil is positioned with the fixed-pole magnet extending through the passageway of the coil. As the coil moves translationally, it passes over the length of the fixed-pole magnet. For an alternate embodiment of the present invention, a plurality of magnets can be mounted on the housing and the electromagnetic coil can be slidingly mounted within the chamber for reciprocation in the magnetic field between the magnets. In either case, conductive wire windings are wrapped around the electromagnetic coil.

The windings wrapped around the electromagnetic coil are connected to an external power source allowing an electric current to be passed through the windings. Adjustments to external power source allow the magnitude and direction of the current flow within the windings to be selectively controlled. As the current flows through the windings, a variable magnetic field is created to interact with the fixed magnetic field in the chamber. In this fashion, a force is created between the fixed-pole magnet and the electromagnetic coil which causes the electromagnetic coil to move translationally within the chamber. The magnitude and orientation of this force are adjustable by appropriate adjustments to the electrical current created by the external power source. As a result, the translational position of the electromagnetic coil may be selectively controlled by appropriate adjustments to the external power source.

In accordance with the present invention, the actuator also includes a grip which is mounted to the electromagnetic coil for translational movement between a retracted configuration and an extended configuration. Preferably, the grip is a hollow rod which is mounted on the electromagnetic coil for translation movement with the electromagnetic coil. For one embodiment of the actuator, the grip can have an end-piece which is operable to grasp the workpiece or component to be moved. In an alternate embodiment for the actuator, a vacuum source can be operatively connected with the rod to create a suction through the hollow rod that holds the workpiece or product component against the rod during transport.

The present invention also includes a retractor consisting of a spring positioned between the electromagnetic coil and the housing. The actual spring may be either a compression or an extension type spring. In the case where a compression type spring is used, the spring is positioned to compress as the electromagnetic coil moves translationally to position the grip in the extended configuration. Alternatively, if an extension type spring is used, the spring is positioned to stretch as the electromagnetic coil moves translationally to position the grip in the extended configuration. At least one endpoint of the spring is movable, allowing installed length of the spring to be selectively adjusted and thereby allowing the force generated by the spring to be reconfigured to suit the needs of a particular application.

For the purposes of the present invention, the physical parameters of the spring are selected to establish a preconfigured translational configuration known as a dwell configuration. In greater detail, and as already discussed, the electromagnetic coil of the present invention is movable to position the grip within a range of translational configurations extending from a retracted configuration to an extended configuration. Generally, the translational configuration of the grip is controlled by operation of the external power source. In the absence of any control from the external power supply, however, the electromagnetic coil is moved by action of the retractor spring until the coil and the grip have reached the dwell configuration. It is particularly important to note that the actuator may be maintained in the dwell configuration without expending current through the electromagnetic coil.

The particular dwell configuration chosen for the actuator depends on the end purpose for which the actuator is intended. For instance, in some cases it may be desirable to choose a dwell configuration that matches the retracted configuration. In most cases, however, a dwell configuration that extends the grip to a configuration intermediate to the extended and retracted configurations will be desirable. In cases where the actuator is used in a lifting or vertical positioning capacity, the retractor spring may be chosen so that the dwell configuration positions the grip, electromagnetic coil and assembly component at a specific vertical elevation. Additionally, the endpoint of the spring may be adjusted to select or tune a particular dwell configuration. Preferably, the dwell configuration is chosen to reflect the elevation at which the grip and assembly component are maintained for the longest time duration during the course of an operational cycle.

In a typical operational sequence of the present invention, the external power supply is used to apply a current to the electromagnetic coil causing the coil and grip to move translationally until an assembly component is contacted. The grip is then caused to grasp the component using vacuum or some other grasping means. The external power source then applies a second current to the electromagnetic coil causing the coil and grip to lift the assembly component until the dwell configuration of the actuator is reached. The actuator may then be moved translationally or rotationally by a variety of methods well known in the pertinent art. A third current may then be applied to the electromagnetic coil lowering the assembly component until the component may be released by the grip. The entire sequence may then be repeated for additional assembly components.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF PREFERRED EMBODIMENTS

Figure 1:
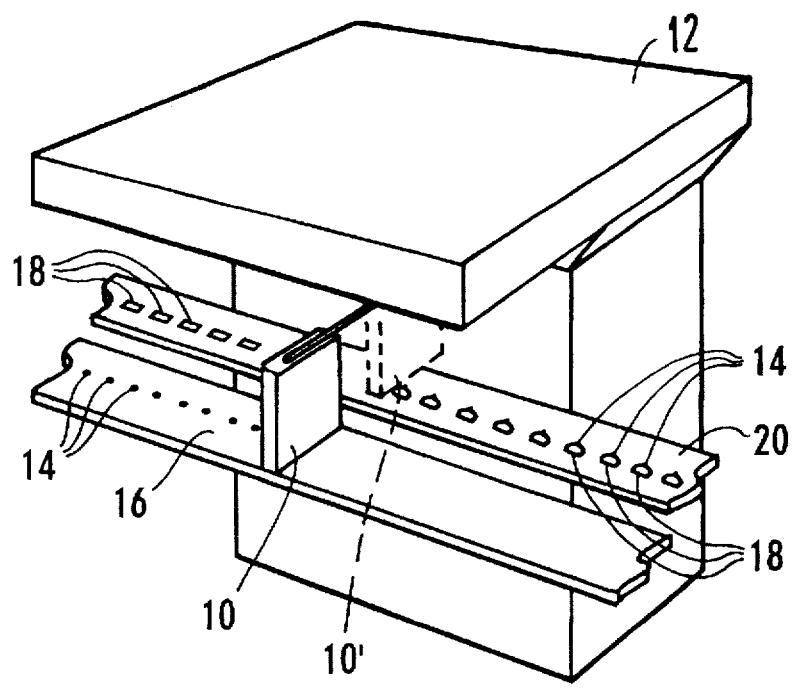
FIG. 1 is an isometric view of the present invention in its operative environment.

Referring initially to FIG. 1, the actuator of the present invention, for moving and positioning an assembly component in an automated assembly operation, is shown in its intended environment and is designated 10. As shown, the actuator 10 is operatively mounted on an automated assembly machine 12 for movement between a position wherein the actuator (designated 10) retrieves a component 14 from a conveyor 16 and transports the component 14 to a position wherein the actuator (designated 10') places the component 14 into engagement with another end product component 18. After their assembly, the combination of components 14 and 18 is then taken by a conveyor 20 to a subsequent workstation where it is packaged or further combined with other components (not shown). As far as the actuator 10 and its operation is concerned, it is to be appreciated that the machine 12 shown in FIG. 1 is only exemplary. Indeed, the actuator 10 can be mounted on a variety of machines (not shown) for movement between a plurality of preselected positions.

Figure 2:
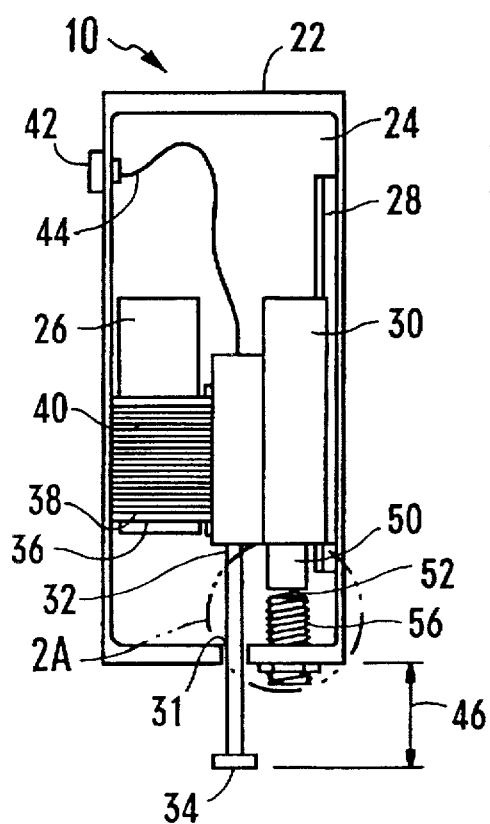
FIG. 2 is a side elevational view of the present invention, shown in the extended configuration with portions removed for clarity.
Figure 2A:
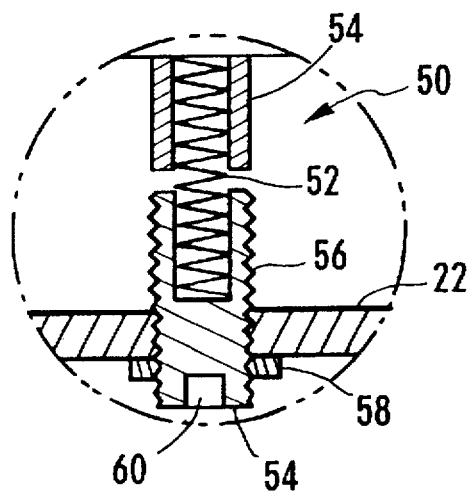
FIG. 2A is an enlarged cut-away of the retractor of the present invention taken from FIG. 2.

The basic structure of the present invention may be seen in FIG. 2 where it can be seen that the actuator 10 includes a housing 22 which is formed to enclose a chamber 24. The housing 22 is relatively compact, and is configured and dimensioned to be comparatively flat. Importantly, though not shown in the figures, this configuration allows the actuator 10 to be easily stacked with other such devices for improved efficiency in an automated assembly operation.

A fixed-pole magnet 26 is mounted to the housing 22 within the chamber 24. The fixed-pole magnet 26 is preferably a rare earth magnet and is formed as a substantially rectangular projection that extends in parallel with the length of the enclosed chamber 24. A rail 28 is also mounted to the housing 22 within the chamber 24 and a piston assembly 30 is slidingly mounted to the rail 28 allowing the piston assembly 30 to move translationally within the chamber 24.

A grip 32 is mounted for translational movement with the piston assembly 30. Preferably, the grip 32 is formed as an elongated tubular member. The proximal end of the grip 32 is mounted to the piston assembly 30 and the distal end of the grip 32 extends through a hole 31 in the housing 22 substantially as shown. The distal end of the grip 32 includes some form of grasping means 34. In general, the grasping means 34 may be implemented using any apparatus or device which allows an assembly component to be selectively grasped and subsequently released. For example, experience has demonstrated that it is often practical to implement grasping means 34 as a vacuum or suction device. Alternatively, grasping means 34 may be implemented using an electromagnet.

The present invention also includes an electromagnetic coil 36. Like the grip 32, the electromagnetic coil 36 is attached to the piston assembly 30 and moves translationally with the piston assembly 30. The electromagnetic coil 36 is formed to surround a passageway (passageway not shown) and the passageway is shaped and dimensioned so that the fixed-pole magnet 26 may be passed through the passageway. The electromagnetic coil 36 is positioned so that the fixed-pole magnet 26 projects through the passageway. As the piston assembly 30 moves translationally within the chamber 24, the electromagnetic coil 36 passes over the length of the fixed-pole magnet 26.

An electrically conductive wire 38 is wrapped or wound repeatedly around the electromagnetic coil 36 to form a winding 40. Preferably, the wire 38 is wrapped around the coil 36 so that the wire 36 is substantially perpendicular to the passageway of the electromagnetic coil 36 at all points along the length of the wire 36. For the purposes of the present invention, the electrically conductive wire 38 is coated with an electrically non-conductive substance.

Continuing with FIG. 2, it may be seen that a connector 42 is attached to pass through the housing 22. Additionally, a flexible harness 44 is attached between the connector 42 and the piston assembly 30. To achieve the goals of the present invention, the connector 42 and harness 44 are configured to pass various signals between the connector 42 and the piston assembly 30. Specifically, the connector 42 and the harness 44 are configured to provide a connection between an external source of electrical current (current source not shown) and the wire 38 wrapped around the electromagnetic coil 36.

As described in the preceding paragraphs, the present invention includes a piston assembly 30, a grip 32 and an electromagnetic coil 36. Both the grip 32 and the electromagnetic coil 36 are attached to move translationally with the piston assembly 30. This translational movement of the piston assembly 30, grip 32 and electromagnetic coil 36 may be best appreciated by comparison of FIGS. 2, 3 and 4. Referring initially to FIG. 2, the actuator 10 is shown in the fully extended configuration. This configuration is characterized by a translational separation, or deflection 46, between the distal end of the grip 32 and the housing 22. In fact, the deflection 46 shown in FIG. 2 is the maximum deflection attainable by the actuator 10.

Figure 3:
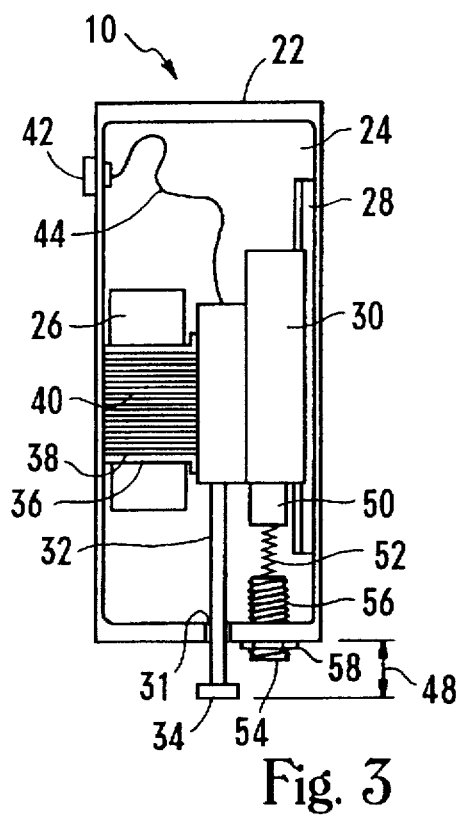
FIG. 3 is a side elevational view of the present invention, as shown in FIG. 2, with the grip of the present invention now shown in an intermediate configuration.

Referring now to FIG. 3, the actuator 10 is shown in an intermediate configuration. The intermediate configuration is characterized by a translational separation, or deflection 48 of the distal end of the grip 32 from the housing 22. Importantly, comparison of FIG. 2 and FIG. 3 reveals the deflection 46 shown in FIG. 2 to be greater than the deflection 48 shown in FIG. 3. The decrease in deflection between FIG. 2 and FIG. 3 is accomplished, of course, by the translational movement of the piston assembly 30, grip 32 and electromagnetic coil 36.

Figure 4:
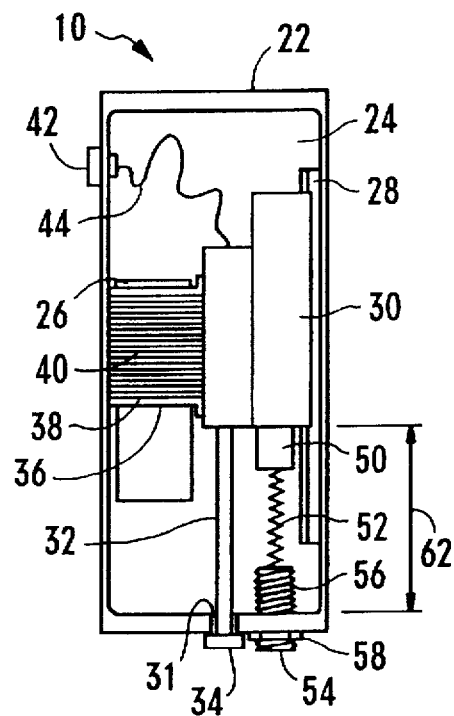
FIG. 4 is a side elevational view of the present invention, as shown in FIG. 3, with the grip of the present invention now shown in the retracted configuration.

Turning finally to FIG. 4, it may be seen that the actuator 10 is shown in a retracted configuration. Unlike the extended configuration shown in FIG. 2 and the intermediate configuration shown in FIG. 3, the retracted configuration shown in FIG. 4 is characterized by a lack of translational separation or deflection between the distal end of the grip 32 and the housing 22. The decrease in deflection between FIG. 3 and FIG. 4 is accomplished, of course, by further translational movement of the piston assembly 30, grip 32 and electromagnetic coil 36.

The translational movement of the piston assembly 30, grip 32 and electromagnetic coil 36, as described above, forms the basic movement of the actuator 10. To cause this translational movement, a variable magnetic field is created using the electromagnetic coil 36. The variable magnetic field interacts with the fixed magnetic field created by the fixed-pole magnet 26, creating a force between the fixed-pole magnet 26 and the electromagnetic coil 36. As a result, the electromagnetic coil 36, along with the piston assembly 30 and grip 32, relocate translationally. In greater detail, the connector 42 and the harness 44 whereby an electrical current may be selectively passed through the wire 38 which forms the winding 40 of the electromagnetic coil 36. As the current passes through the winding 40, a variable magnetic field is created in the chamber 24. The magnitude and polarity of this force are selectable by appropriate adjustments to the magnitude and polarity of the electric current. The variable magnetic field necessarily interacts with the fixed magnetic field created by the fixed-pole magnet 26 creating a force between the fixed-pole magnet 26 and the electromagnetic coil 36. As a result, the electromagnetic coil 36, grip 32 and piston assembly 30 will move translationally. The force, direction and duration of the translational movement is selectable by appropriate adjustments to the magnitude and polarity of the electric current.

The actuator 10 of the present invention also includes a retractor 50 mounted between the housing 22 and the piston assembly 30. The retractor 50 includes a return spring 52 mounted within a spring guide 54. For clarity, the retractor 50 is enlarged and shown separately in FIG. 2. It may be appreciated that translational movement of the piston assembly 30 will cause the return spring 52 to become either compressed or extended. This effect of movement of the piston assembly 30 on the return spring 52 may be visualized by comparison of FIG. 2 and FIG. 3. In FIG. 2, the piston assembly 30 has been moved to extend the grip 32. As a result, the return spring 52 has become compressed. In comparison, FIG. 3 shows the actuator 10 after the piston assembly 30 has translationally moved to partially retract the grip 32. As a result, the return spring 52 has become somewhat extended. It is to be appreciated that the return spring 52 will exert a force on the piston assembly 30 that increases as the actuator 10 approaches the fully extended configuration shown in FIG. 2.

To allow some adjustment to the force generated by the return spring 52, the present invention preferably includes a threaded barrel 56 on spring guide 54. The threaded barrel 56 passes through housing 22, allowing the spring guide 54 to be rotatably advanced or retracted to increase or decrease the force generated by the return spring 52. Preferably, spring guide 54 also includes a lock nut 56 and a slot 60. The slot 60 is engagable with a bladed tool, such as a screwdriver or allen wrench, simplifying the task of advancing or retracting the spring guide 54. Once the spring guide 54 has been correctly positioned by use of slot 60, the lock nut 56 engages the housing 22 to maintain the position of the spring guide 54.

As discussed, return spring 52 has the effect of applying a force directed against the piston assembly 30 that increases as the piston assembly 30, electromagnetic coil 36 and grip 32 move to adopt the fully extended configuration shown in FIG. 2. The result of this force is that the piston assembly 30, electromagnetic coil 36 and grip 32 are biased to return to a specific, and predetermined, translational configuration, such as the translational configuration shown in FIG. 2. This translational configuration is known as the dwell configuration. Importantly, the dwell configuration is maintained by the return spring 52 until some force, such as the force applied by the electromagnetic coil, causes the actuator 10 to alter the translational configuration of the piston assembly 30, electromagnetic coil 36 and grip 32. As a result, the actuator 10 may be maintained in the dwell configuration without consumption of electric power by the electromagnetic coil 36. By appropriate selection of return spring 52, any translational configuration between the extended configuration shown in FIG. 2 and the retracted configuration shown in FIG. 4 may be selected as the dwell configuration. For the purposes of illustration, however, the following discussion assumes that the dwell configuration for the actuator 10 has been chosen to match the intermediate configuration shown in FIG. 3.

Generally, for purposes of the present invention, it is desirable to specifically choose a dwell configuration which reflects the end use to which the actuator 10 will be put. For instance, in many cases, the actuator 10 will be repeatedly cycled through a sequence of steps which comprise an operational cycle. In such cases, it is desirable to choose a dwell configuration so that the amount of time spent by the actuator 10 in the dwell configuration is maximized. Maximizing the portion of the operational cycle spent in the dwell configuration has the effect of reducing power consumption and associated production of waste heat.

Regardless of the translational configuration chosen for the dwell configuration, selection of the return spring 52 may be accomplished by following a specific process. To begin the selection process, the actuator 10, and the intended environment for the actuator 10, are first analyzed to define the total moving load (denoted W) that must be overcome by the return spring 52 to place the actuator 10 in the dwell configuration. For the specific case of an actuator 10 that is vertically oriented (such as the actuator 10 shown in FIGS. 2 through 4) and used to vertically reposition assembly components, the calculated value of W will include the weight of the piston assembly 30, the electromagnetic coil 36, the grip 32, attachment means 34 as well as one-half of the weight of the return spring 52. Additionally, the calculated value of W is preferably adjusted to include the weight of the assembly component to be repositioned allowing the actuator 10 to naturally adopt the dwell configuration under load.

Once a value for W has been determined, the actuator 10 is measured to determine the deflection of the return spring 52. The deflection, or L1, is defined as the change in the overall length that the return spring 52 will undergo as the actuator 10 moves from the retracted configuration to the dwell configuration. In the case of the actuator 10 shown in FIG. 3, deflection L1 corresponds to the deflection 48. Finally, after values have been obtained for W and L1, a return spring 52 is selected so that the equation L1=W/K is satisfied, where K is the spring coefficient of the selected return spring 52. A particular dwell configuration may, of course, be further refined by adjustment to the spring guide 54.

By following the process for selection of the return spring 52, as just described, a specific return spring 52 may matched to a desired dwell configuration. Importantly, however, the present invention recognizes that a number of additional criteria may be applied to the selection process for the return spring 52. Choosing a return spring 52 that meets these additional criteria results in higher operational reliability for the return spring 52 and actuator 10. To understand these criteria, it is first necessary to define a number of physical parameters which describe the return spring 52 and other aspects of the actuator 10. With regard initially to the return spring 52, it is adequate to note that return spring 52 is characterized by a free length, denoted L, an installed length, denoted D, and a solid compressed length, denoted Ls. Free length L, installed length D and solid compressed length Ls are all measured using techniques well known in the art. Importantly, installed length D is measured when the grip 32 is in the retracted configuration as shown in FIG. 4. For purposes of illustration, the installed length D of the return spring 52 is shown in FIG. 4 and designated 62.

Proper selection of the return spring 52 also requires measurement of the maximum deflection, or L3, of the actuator 10. Maximum deflection L3 is defined as the change in the overall length that the return spring 52 will undergo as the actuator 10 moves from the retracted configuration to the extended configuration. In the case of the actuator 10 shown in FIG. 2, maximum deflection L3 corresponds to the deflection 46. Importantly, the maximum deflection L3 corresponds to the greatest deflection which the return spring 52 will be subject to during the operation of the actuator 10.

The actuator 10 is also characterized by a stroke L2. More specifically, the stroke L2 is defined as the change in the overall length that the return spring 52 will undergo as the actuator 10 moves from the dwell configuration to the extended configuration. Stroke L2 is not specifically shown in the figures. However, for the actuator 10, it may be appreciated that the stroke L2 is equivalent to the change in translational configuration as the actuator 10 moves from the configuration shown in FIG. 3 to the fully extended configuration shown in FIG. 2.

Finally, several parameters relating to force and weight must be ascertained. These include: the required output force of the actuator, denoted Fr, the actual output force of the actuator, denoted F, and a safety factor, denoted Ks. Measurement of parameters Fr and F generally follows techniques well known in the art. Parameter Ks, on the other hand, is a numerical value exceeding one which is determined according to methods well known in the art.

Keeping the foregoing parameters in mind, the process of spring selection is completed by selection of a return spring 52 which simultaneously solves the following six equations:

$$L1=W/K$$

$$L3=(L1+L2)*Ks$$

$$L2*K<W$$

$$L2*K<(F-Fr)$$

$$D=L-L1$$

$$L=L3+Ls$$

As previously discussed, the return spring of the actuator 10, as shown in FIGS. 2, 3 and 4 is a compression type spring which becomes increasingly compressed as the actuator moves from the retracted configuration shown in FIG. 4 to the extended configuration shown in FIG. 2. Alternatively, the return spring 52 shown in FIGS. 2, 3 and 4 may be replaced by an extension type spring of the type show in FIGS. 5 and 6 and designated 64. More specifically, it may be seen in FIG. 5 that the actuator 10 is in an extended configuration similar to the actuator 10 shown in FIG. 2. Similarly, the actuator 10 of FIG. 6 is shown in a retracted configuration matching the retracted configuration of the actuator 10 of FIG. 4. Importantly, the overall length of the spring 64 shown in FIG. 5 exceeds the overall length of the spring 64 shown in FIG. 5. In other words, the return spring 64 is forced to expand as the actuator 10 moves from the retracted configuration shown in FIG. 6 to the extended configuration shown in FIG. 5. As a result, the return spring 64 applies the same type of force to the piston assembly 30 as is applied by the return spring 52.

Figure 5:
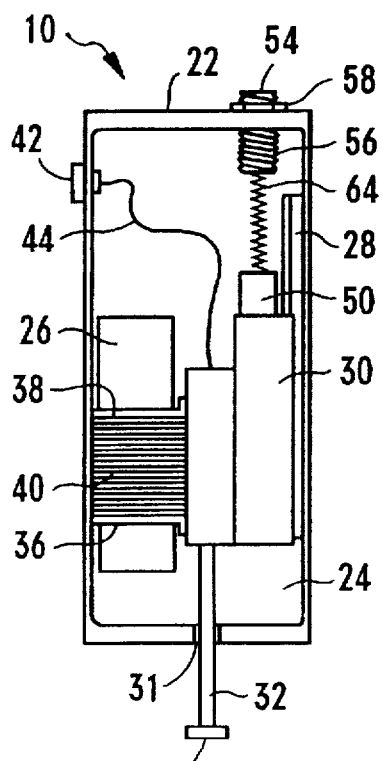
FIG. 5 is a side elevational view of an alternate embodiment of the present invention, shown in the extended configuration with portions removed for clarity.
Figure 6:
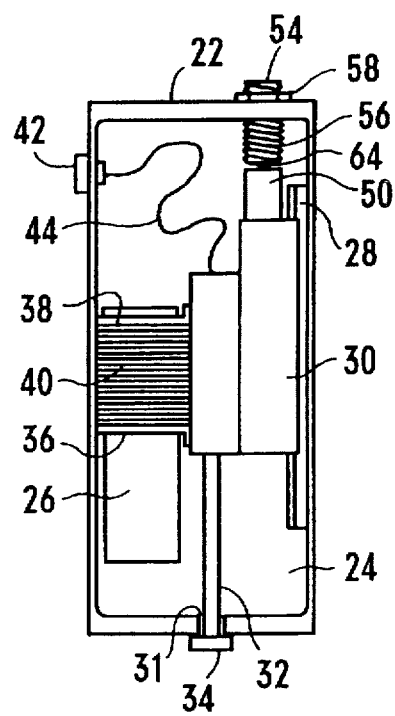
FIG. 6 is a side elevational view of an alternate embodiment of the present invention, as shown in FIG. 5 with the grip of the present invention now shown in the retracted configuration.

Importantly, the return spring 64 of FIGS. 5 and 6 may be configured to create the same range of dwell configurations attainable with return spring 52. Generally, the selection process whereby a specific return spring 64 may is chosen for use in actuator 10 follows the process previously outlined for compression type return spring 52. In the case of extension type spring 64, however, an additional parameter, namely the initial tension of the return spring 64, denoted Fi, must be ascertained. The selection process then chooses a specific spring which satisfies the following five equations:

$$L1=(W-Fi)/K$$

$$L3=(L1+L2)*Ks$$

$$L2*K<W$$

$$L2*K<(F-Fr)$$

$$D=L+L1$$

OPERATION

Operation of the present invention is generally preceded by selection of a proper dwell configuration. This is generally accomplished by a combination of spring selection, as described above, and adjustment to the threaded barrel 56 of the spring guide 54 to fine tune the installed length 62 of the return spring 52.

In operation, the present invention is generally cycled through a repetitive sequence of steps. These steps generally involve grasping an assembly component, moving or otherwise repositioning the component, and releasing the component. To begin an exemplary sequence of steps, an external power supply passes an electrical current through the connector 42 and the harness 44 to energize the winding 40 wrapped around the electromagnetic coil 36. The electric current in the winding 40 produces a variable magnetic field in the chamber 24 which interacts with the fixed magnetic field produced by the fixed-pole magnet 26. The interaction between the variable magnetic field and the fixed magnetic field creates a force between the electromagnetic coil 36 and the fixed-pole magnet 26. As a result, the piston assembly 30 moves translationally to reposition the grip 32. Selective control of the polarity and magnitude of the electric current allows the translational movement of the piston assembly 30 and the grip 32 to be controlled allowing the grip 32 and the grasping means 34 to be positioned against the assembly component.

Once the grasping means 34 has contacted the assembly component, a vacuum may be created within the grip 32 and grasping means 34 to hold the assembly component in contact with the grasping means. Alternatively, the grasping means 34 may be implemented electromagnetically to allow retention of the assembly component using magnetic force.

After the assembly component has become securely affixed to the grasping means 34, the electrical current in the winding 40 may be disabled, dissolving the variable magnetic field produced by the electromagnetic coil 36 and winding 40. Freed from the force created by the interaction between the variable magnetic field and the fixed magnetic field, the piston assembly 30, electromagnetic coil 36, grip 32, grasping means 34 and assembly component are free to move translationally under the influence of the return spring 52. This translational movement continues until the grip 32 reaches the dwell configuration defined by the proceeding equations. Once the dwell configuration has been reached, the actuator 10 and assembly component may be rotated or moved translationally by means well known in the art. Importantly, the action of the return spring 52 maintains the actuator 10 in the dwell configuration without the passage of any electrical current through the winding 40 thereby reducing power consumption and heat generation.

After the assembly component has been relocated or otherwise processed, a second electrical current may be passed through the winding 40 to once again cause the actuator 10 to relocate the assembly component. The operational sequence ends as the grasping means 34 releases the assembly component allowing the cycle to be repeated for additional assembly components While the particular actuator for moving and positioning an assembly component in an automated assembly operation as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. A device for moving and positioning an assembly component in an automated assembly operation which comprises:

a housing;

a magnet formed as a projection mounted on said housing for creating a magnetic field;

an electromagnetic coil slidably mounted on said housing for carrying a current, said coil being disposed for reciprocal translational movement within said magnetic field in response to current flow through said coil, and wherein said electromagnetic coil is formed with a passageway for slidingly receiving said projection of said magnet, for translational movement of said electromagnetic coil along said magnet, and wherein said electromagnetic coil further includes an electrically conductive wire wound around said electromagnetic coil;

a grip mounted on said coil for reciprocal translational movement between a retracted configuration and an extended configuration;

a retractor for causing said grip to move translationally to adopt a dwell configuration in the absence of current flow through said coil; and means electrically connected with said coil for providing said electrical current to move said coil in translation.

2. A device as recited in claim 1 wherein said retractor is adjustable to selectively configure said dwell configuration.

3. A device as recited in claim 1 wherein said retractor comprises a coil spring positioned between said housing and said coil, said coil spring being increasingly deformed as said grip moves translationally from said retracted configuration to said extended configuration, said deformation of said coil spring causing a force to be applied to said grip in opposition of said translational movement.

4. A device as recited in claim 3 wherein said coil spring has an installed length and wherein said retractor further comprises means for selectively adjusting said installed length.

5. A device as recited in claim 4 wherein said means for selectively adjusting said installed length of said coil spring comprises a spring guide positioned between said housing and said coil, said position of said spring guide adjustable relative to said housing to increase or decrease said installed length of said coil spring.

6. A device as recited in claim 1 wherein said dwell configuration is intermediate to said extended configuration and said retracted configuration.

7. A device for transporting and positioning an assembly component which comprises:

a housing;

a rare earth magnet mounted on said housing for creating a magnetic field;

a electromagnetic coil for carrying a current, said coil being disposed around said magnet for reciprocal translational movement within said magnetic field in response to said current;

a grip for holding said assembly component, said grip being attached to said coil for reciprocal translational movement between a retracted configuration and an extended configuration; and a return spring to cause said grip to return to a predetermined dwell configuration in the absence of said electrical current, wherein said return spring comprises a coil spring positioned between said housing and said coil, said coil spring being increasingly deformed as said grip moves translationally from said retracted configuration to said extended configuration, said deformation of said coil spring causing a force to be applied to said grip in opposition of said translational movement; and a spring guide positioned between said coil spring and said housing.

8. A device as recited in claim 7 wherein said magnet is formed as a projection.

9. A device as recited in claim 7 wherein said grip is formed as a rod attached to said coil to project through said housing.

10. A device as recited in claim 9 which further comprises grasping means attached to said grip for grasping said assembly component.

11. A device as recited in claim 10 wherein said grip is substantially contained within said housing when said grip adopts said retracted configuration.

12. A device as recited in claim 11 wherein said grip protrudes from said housing when said grip adopts said extended configuration.

13. A device as recited in 7 wherein said coil spring has an installed length and wherein said spring guide is adjustable to select said installed length.

* * * * *